United States Patent [19]

Kobayashi et al.

[11] 3,862,365

[45] Jan. 21, 1975

[54] SYNCHRONIZING SYSTEM FOR A PLURALITY OF SIGNAL TRANSMITTERS USING OSCILLATORS OF HIGH FREQUENCY STABILITY

[75] Inventors: Hachisaburo Kobayashi, Yokohama; Shigeru Toyosaki, Tokyo; Hisashi Uchida, Tokyo; Yoshikatsu Sato, Tokyo; Kohei Saitoh, Tokyo; Masakazu Tsuji, Tokyo, all of Japan

[73] Assignees: Nippon Haso Kyokai; Nippon Electric Company, Limited, both of Tokyo, Japan

[22] Filed: Nov. 8, 1972

[21] Appl. No.: 304,880

[30] Foreign Application Priority Data

| | | |
|---|---|---|
| Nov. 12, 1971 | Japan | 46-89917 |
| Nov. 12, 1971 | Japan | 46-90966 |
| Nov. 12, 1971 | Japan | 46-90967 |

[52] U.S. Cl. ................ 178/69.5 R, 325/58, 343/179

[51] Int. Cl. ................ H04b 3/50

[58] Field of Search .............. 178/5.4 SY, 69.5 R, 178/69.5 D–69.5 C; 179/15 BS; 325/51, 58, 3; 343/179

[56] References Cited

UNITED STATES PATENTS

| | | | |
|---|---|---|---|
| 3,382,452 | 5/1968 | Rempel et al. | 331/94 |
| 3,683,279 | 8/1972 | Weinberg et al. | 325/58 |

*Primary Examiner*—Robert L. Griffin
*Assistant Examiner*—Marc E. Bookbinder
*Attorney, Agent, or Firm*—Sughrue, Rothwell, Mion, Zinn & Macpeak

[57] ABSTRACT

A synchronizing system for synchronizing independently operating reference frequency signal oscillators of at least two transmitters. The phase relation between the signals produced by the two transmitters is monitored and when the phase difference exceeds a predetermined value, the frequency of one of said oscillators is deviated in a direction to invert the sign of the phase difference between the two signals, thereby bringing the phase difference below the predetermined value.

9 Claims, 4 Drawing Figures

SYNCHRONIZING SYSTEM FOR A PLURALITY OF SIGNAL TRANSMITTERS USING OSCILLATORS OF HIGH FREQUENCY STABILITY

This invention relates to an independent-oscillation type synchronizing system or the so called "gen-lock" system for a plurality of signal transmitters each having an individual oscillator of high frequency stability, such as a rubidium atomic oscillator.

It has been proposed that a synchronization be achieved between a plurality of the transmitters located far apart from each other, by the use of high-precision and high stability oscillators, such as rubidium atomic oscillators, without resorting to automatic-frequency-controlled oscillators controlled by signals supplied from other transmitters.

In such conventional independent-oscillator type synchronizing system, the rubidium atomic oscillator of high frequency stability (of the order of, e.g., $1 \times 10^{-11}$ to $5 \times 10^{-11}$) is installed in every pair of the transmission stations; one is a base station and the other a remote station. Relatively-low-frequency transmission signals such as horizontal and vertical synchronizing signals in the case of a television video signal transmission, or the frame synchronizing pulses in the case of a PCM transmission system, are brought into phase with each other at the start of the operation of the system. Then, the phase difference between the aforementioned transmission signals from the two stations can be maintained within a preset tolerance for a considerable period of time in spite of the use of the mutually independent oscillators, because their stability is sufficiently high in terms of frequency for this purpose. This does not hold true for the color-subcarrier signal in case of color television transmission, or for the clock pulse signals for a PCM transmission system. For these transmission signals of relatively-high-frequency, the automatic synchronization or the phase-locking is attained by the use of an automatic phase shifter installed at the base station.

There is a limit, however, to the shift range of such automatic phase shifter. In other words, the period of time where the phase difference between these transmission signals lies within the shift range of the automatic phase shifter is subject to the aforementioned limit. More specifically, when the automatic phase shifter having a 360° shift range with respect to the color-subcarrier wave of 3.579545 MHz and the rubidium atomic oscillator having the stability of the order of $2 \times 10^{-11}$ are used in the NTSC color television system, the above-mentioned period of time will be about 4 hours. In the case of a 24-CH PCM transmission system having an automatic phase shifter of the 360° shift range with respect to the clock pulse signal frequency 1.544 MHz and the rubidium oscillator of a comparable frequency stability, the corresponding period of time will be about 9 hours.

Obviously, these lengths of time are not sufficient for the color television signal transmission or the above-mentioned PCM signal transmission.

The extension of these lengths of time may be obtained by enhancing the frequency stability of the atomic oscillators installed at both transmission stations or by extending the shift range of the automatic phase shifter. However, the former is technically difficult or expensive, while the latter, i.e., the extension of the shift range, involves the deterioration in the transmission characteristics.

It is, therefore, an object of this invention to provide an improved independent-oscillation type synchronizing system capable of extending considerably or infinitely the length of time in which the transmitters are kept in synchronism.

According to this invention, there is provided an improved synchronizing system in which an oscillator of high frequency stability capable of deviating its oscillation frequency to an upper- and a lower-side frequencies with respect to a reference frequency is installed at a remote station and every time the amount of the phase shift at the automatic phase shifter installed at a base station reaches a predetermined limit, the oscillation frequency in the remote station is caused to deviate so as to advance or retard the phase.

In the synchronizing system according to this invention, the frequency deviation in the oscillator of the remote station helps the phase shift amount of the automatic phase shifter to remain within the shift range of the automatic phase shifter so that the signals of the base station and the remote station may be always in synchronism.

Now, the features and advantages of this invention will be understood from the following detailed description of a preferred embodiment of this invention taken in conjunction with the accompanying drawings, wherein.

Figure 1:
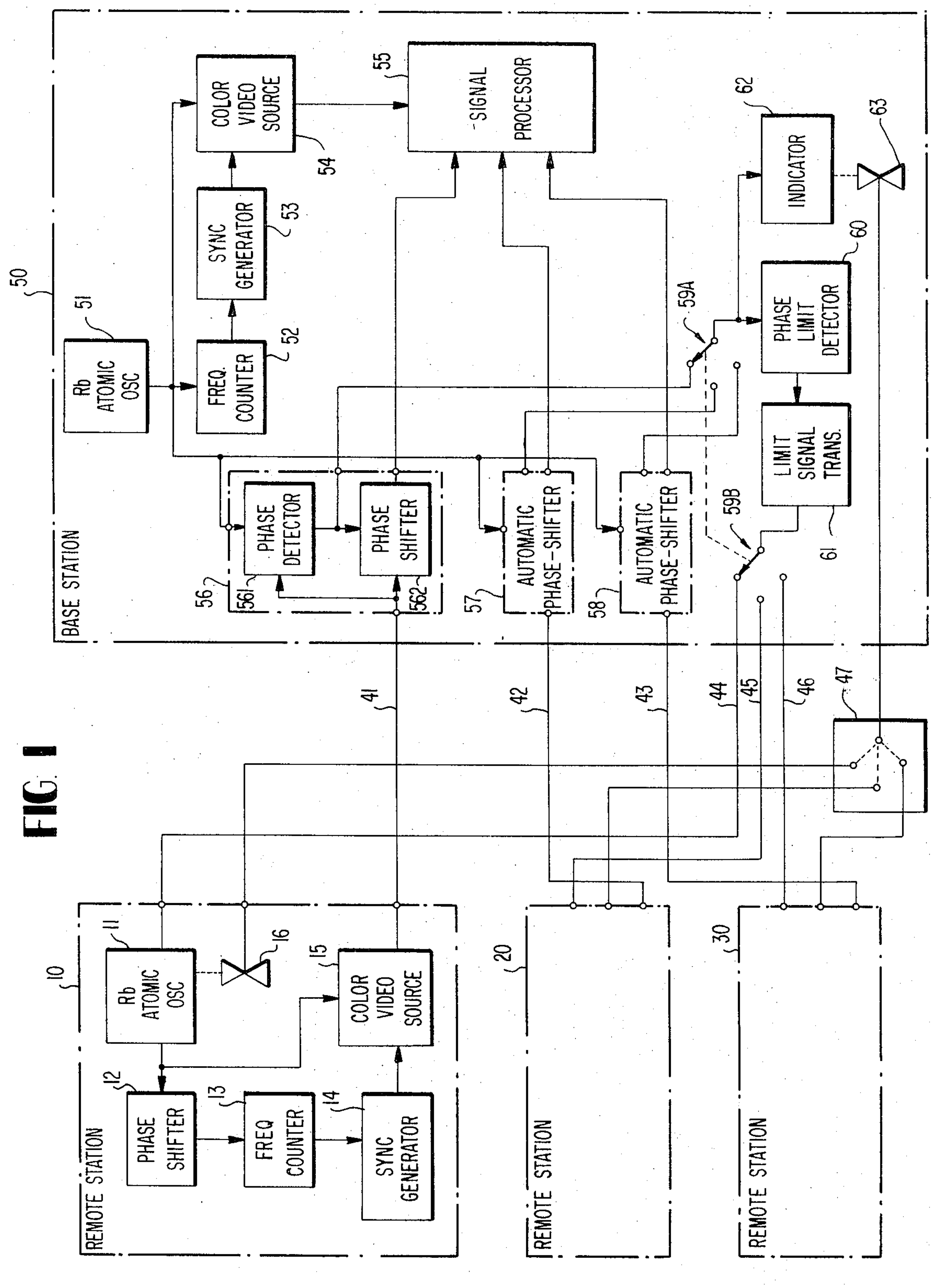
FIG. 1 is a block diagram of a preferred embodiment of this invention.

Referring to FIG. 1, there is shown an embodiment of this invention as applied to a multi-station synchronizing system of the NTSC color television broadcast. This embodiment comprises three remote stations 10, 20, and 30 located far apart from one another; a base station 50 at which signals delivered from the remote stations are incoming, and transmission lines connecting the base station to each remote station.

Conventional multi-station broadcasting systems are described, for example, in the following articles which appeared in the *Journal of the Society of Motion Picture and Television Engineers*, vol. 78, no. 8, August, 1969: "Color Picture Source Synchronization by the Natlock System" by D. N. Gregory, J. L. Bliss, I. D. B. Millar and C. J. Allen, pages 611 to 614; "Remote Color Genlock" by Robert J. Butler, pages 615 to 618; "Synchronization of Remote Program Sources for Color TV Broadcasting" by Hans Schmid, pages 619 to 620; "The CBS Automatic Color Wire-Lock System" by Frank Davidoff, pages 621 to 625; and "Panel Discussion: Automatic Color Locking Systems" moderated by Richard W. Rodgers, pages 626 to 628.

Figure 2:
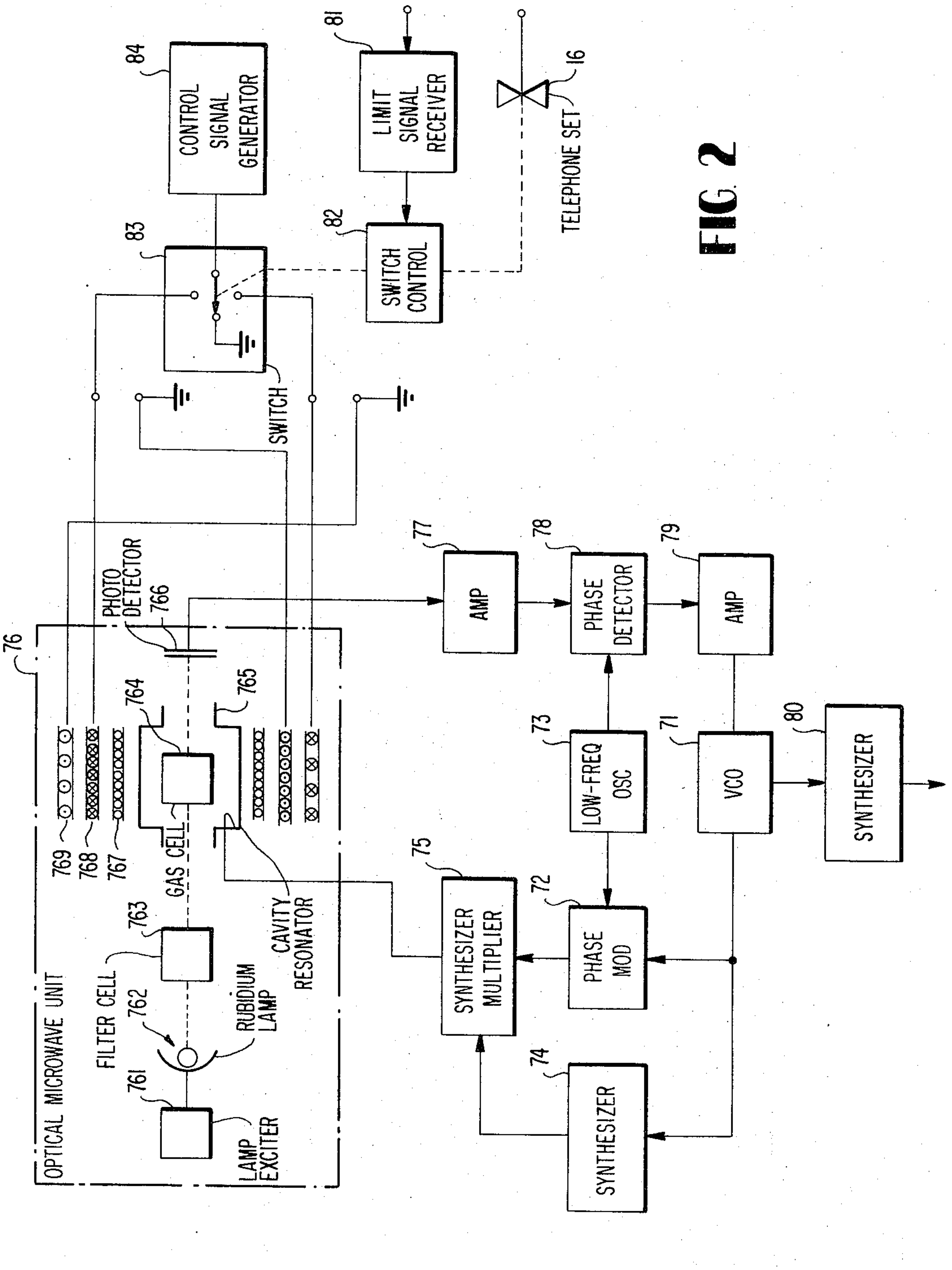
FIG. 2 is a block diagram of an atomic oscillator installed at a remote station of the embodiment shown in FIG. 1.

In the remote station 10, a color-subcarrier signal of frequency fo (3.579545 MHz according to the NTSC standards) from a rubidium atomic oscillator 11 with a circuit structure as will be detailed in FIG. 2 is applied to a phase shifter 12 to phase-shift for the reasons to be described later mentioned. An output signal from the phase shifter 12 is applied to a frequency counter 13 for the frequency division with a ratio of 4/455, or for the provision of a signal of twice-the-horizontal synchronizing-signal frequency. The output of the frequency counter 13 is applied to a sync generator 14. The sync generator 14 generates a group of synchronizing signals of a composite synchronizing signal, a composite retrace blanking signal, burst flag signal, a horizontal drive signal, and a vertical drive signal. These synchronizing signals are applied together with the color subcarrier from the atomic oscillator 11 to a color video signal producing means 15. The color video signal producing means 15 may, for example, be a color television camera or a video tape recorder, and generates a color video signal, receiving the synchronizing signals and the color subcarrier. The color video signal is delivered to the base station 50 through a transmission line 41. Both remote stations 20 and 30 are identical in composition to the remote station 10, and color video signals thus obtained are delivered to the base station 50 respectively through transmission lines 42 and 43.

In the base station 50, a signal of color-subcarrier frequency from a rubidium atomic oscillator 51 is applied to a frequency counter 52, wherein the frequency is divided down to a frequency which is twice the horizontal sync frequency and the frequency-divided signal is applied to a sync generator 53 identical to the sync generator 13 at the remote station 10. A color video signal generator 54 receives synchronizing signals from the sync generator 53 and a color subcarrier from the atomic oscillator 51 and generates color video signals for the base station. The video signal is delivered to a signal processing device 55. The signal processing performed by the signal processor 55 is such that the TV signals from the remote stations and the base station are switched, mixed and/or keyed with each other. Signal processors of this type are described in U.S. Pat. No. 3,619,495 to Ito et al for "Television Picture Montage Circuit" issued Nov. 9, 1971, and U.S. Pat. No. 3,673,324 to Ito et al for "Video Mixing/Special Effects Amplifiers" issued June 27, 1972.

On the other hand, the color video signal delivered from the remote station 10 via the transmission line 41 is applied to an automatic phase shifter 56. The automatic phase shifter 56 comprises a phase detector 561 for producing a phase-difference signal in response to the phase difference between the color subcarrier contained in the color video signal supplied from the remote station 10 and the subcarrier fed from the atomic oscillator 51 and a phase shifter 562 for phase-shifting the color video signal supplied from the remote station 10 by the use of the phase-difference signal. The provision thus enables the color video signal supplied from the remote station 10 to be pulled into synchronism with the color video signal produced at the base station. The signal from the remote station that has been locked in synchronism with the signal of the base station is subsequently applied to the signal processing device 55. With this circuit arrangement, synchronism can be maintained by detecting the phase difference between the signals of the base and remote stations by the phase detector 561 and controlling the amount of the phase shift of the phase shifter 562 in response to the phase difference. However, the phase shift amount advances toward a plus or minus limiting amount (for example, ±180°) with an elapsed time to eventually reach either limit. On reaching the limit, there will be no more phase shift and it will be no longer possible to maintain synchronism.

In order to solve this problem, the atomic oscillator installed at the remote station is designed to be capable of deviating its oscillation frequency to the upper- or the lower-side frequency with respect to the reference frequency $fo$. Every time the phase shift amount of the phase shifter reaches the limit, the oscillation frequency of the atomic oscillator at the remote station is caused to deviate in a sense to cause a reverse phase shift.

Now the principles of this invention will be described by referring to FIG. 4. A description will be given, for simplicity, of a case where the oscillation frequency of the atomic oscillator at the base station is lower than that of the remote station by an amount $\Delta f$.

Figure 4:
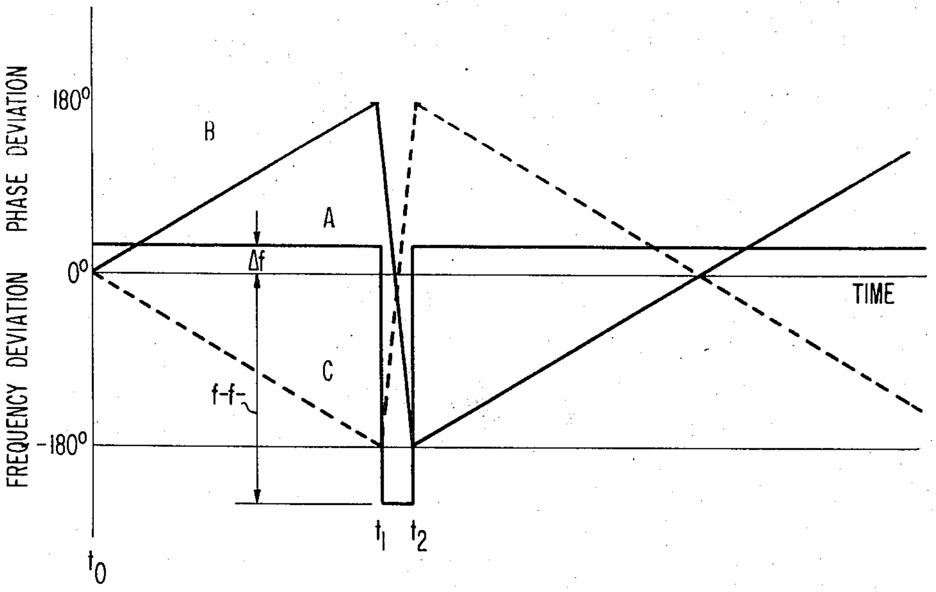
FIG. 4 shows the change with time of the phase shift of the embodiment of FIG. 1.

Referring to FIG. 4, the change with time of the frequency and phase deviation referenced to the base station is shown. At the time point designated by $t_o$, the two signals are in phase. Since there is the frequency difference A of $\Delta f$ between the two oscillation frequencies, the phase difference B between the two signals increases with time.

Although this phase difference can be compensated for by the phase shift amount C in the automatic phase shifter, no more increase of the phase shift can occur when the phase shift reaches the negative limit, or −180°.

It is assumed that the oscillation frequency of the atomic oscillator at the remote station at the moment $t_1$ at which the amount of phase shift C reaches the negative limit is switched to $f_-$, or the lower-side frequency lower than the reference frequency. By making the lower-side frequency $f-$ lower than the oscillation frequency of the base station, the phase difference between the two signals occurs reverse — that is, toward +180° from −180° via 0°, and the phase shift advances toward −180° from +180°. If the difference $f-f_-$ between the reference frequency $f$ of the base station and the lower-side frequency $f_-$ of the atomic oscillator of the remote station is taken greater than the frequency difference $\Delta f$ between the two stations, the other limit will be reached in a short period of time. As soon as the phase shift amount reaches the limit (phase difference is −180° and phase shift is +180°) (at time $t_2$ ), the oscillation frequency is restored to the reference frequency. On restoration, the oscillation frequency of the atomic oscillator of the remote station will be higher than the frequency of the base station by $\Delta f$, with the result that the phase difference will advance from −180° to +180°. As soon as phase difference reaches +180°, the oscillation frequency of the remote station is switched to the lower-side frequency and the operation is repeated thenceforth. Thus, the phase difference can be held between +180° and −180° infinitely and the signals of the two stations can be locked in synchronism by means of the phase shifter.

It will be obvious that when the reference frequency of the atomic oscillator at the remote station is lower than the oscillation frequency of the base station, the oscillation frequency of the remote station should be switched to the upper-side frequency $f_+$.

Referring again to FIG. 1, there is provided at the base station 50 means for delivering the detected phase difference information to the atomic oscillator 11 at the remote station. Stated more particularly, the output phase-difference signal from the phase detector 561 of the automatic phase shifter 56 is selectively applied, via a switch 59A, to a phase-limiting detector 60. Further, phase-difference signals from the automatic phase shifters 57 and 58 corresponding to the remote stations 20 and 30 are also selectively applied to the phase-limiting detector 60 via the switch 59A. The phase-limiting detector 60 is designed to produce a positive or negative limit signal as soon as the phase-difference signal exceeds a positive or a negative phase-difference limit or any other preset level. Generally the voltage of the phase-difference signal from the phase detector 561 represents the phase difference between two signals. Therefore, the phase limit detector 60 in FIG. 1 may be composed of a voltage detector adapted to detect the voltage of a phase-difference signal from the phase detector 561 and to produce a pulse when the detected voltage reaches a predetermined value. The positive or negative limit signal is transmitted from a limit signal transmitter 61, as it is, or after conversion into a mode suitable for transmission, to a corresponding remote station, via a switch 59B interlocked with the switch 59A and transmission line 44, 45 or 46 to control the oscillation frequency of the atomic oscillator of the corresponding remote station.

Although there is provided a single means for detecting the limit signal and transmitting the signal to the remote station in this embodiment, it will be evident that the single means is sufficient to control a plurality of remote stations, because the frequency stability of these atomic oscillators is extremely high, and synchronism can be maintained for a long period of time, whereas the control of each remote station is achieved within a brief period of time. There is no objection, however, to installing a plurality of such means for individual control of the remote stations.

Referring next to FIG. 2, detailed description will be given of the atomic oscillator 11 installed at the remote station 10. An output signal from a voltage-controlled crystal oscillator 71 with the center frequency set at 5 MHz and the oscillation frequency controlled by a control voltage is applied to a phase modulator 72 and phase-modulated by a 110 Hz low-frequency signal incoming from a low-frequency oscillator 73. The output of the phase modulator 72 is applied to a frequency synthesizer-multiplier 75 together with a signal delivered from a frequency synthesizer 74 to which the output of the oscillator 71, is applied. The frequency synthesizer-multiplier 75 performs frequency synthesis and multiplication of the output signals of the phase modulator 72 and the frequency synthesizer 74 so that its output frequency coincides with the hyperfine resonant frequency of 6,834 MHz corresponding to the transition $F=2, M_F=0 \rightarrow F=1, M_F=0$ of a rubidium isotope. The signal is fed to a cavity resonator 765 in an optical microwave unit 76.

The optical microwave unit 76, magnetically shielded for the protection from stray magnetic fields, comprises a lamp exciter 761, a rubidium lamp 762, a filter cell 763, a gas cell 764, a cavity resonator 765, an photo detector 766, and a plurality of coils 767, 768, and 769 for creating a magnetic field.

When the gas cell 764 is subject to the influence of a magnetic field in coincidence with the hyperfine frequency, light beam energy from the rubidium lamp 762 is absorbed into the gas cell. In other words, if the output frequency of the frequency synthesizer-multiplier 75 coincides with the hyperfine frequency, a light beam from the rubidium lamp 762 is absorbed in the gas cell 764. Now, since the output from the frequency synthesizer-multiplier 75 has been phase-modulated by a low-frequency signal, a phase-modulated wave or a signal of twice its frequency will be obtained from the photo-detector 766. This signal, passing through an amplifier 77, is applied to a phase detector 78 and a phase-error signal is obtained at the output. The phase-error signal controls the oscillation frequency of the voltage-controlled crystal oscillator 71 via an amplifier 79. In such a way, the voltage-controlled crystal oscillator is frequency-synchronized with the hyperfine resonant frequency of the isotope of the rubidium 87. Thus its output frequency should be extremely stabilized. A 5 MHz signal from the voltage-controlled oscillator 71 is applied to a frequency synthesizer 80 for the conversion into a desired frequency suited for the desired purpose. For example, if the atomic oscillator is used as a color-subcarrier source of a color television equipment, the frequency from the voltage-controlled oscillator 71 is converted to 3.579545 MHz, and if used as a clock pulse source of the 24-CH PCM transmission system, converted to 1.544 MHz.

The circuitry of the synthesizers 74, 75 and 80 shown in FIG. 2 are all well known circuits in the video processing art. See, for example, FIG. 2 on page 612, FIG. 4 on page 620, FIG. 2 on page 622, and FIG. 3 on page 623 appearing in the *Journal of the Society of Motion Picture and Television Engineers*, Vol. 78, No. 8, August, 1969, in which synthesizers are used in various color video synchronizing systems. As used in the art, frequency synthesizers typically are frequency multipliers and dividers or counter circuits. For example, referring to U.S. Pat. No. 3,382,452 issued to Rempel et al., for "Frequency Stabilization Apparatus," the divider and multiplier 79, the divider 81 and the sideband modulator 84 shown in FIG. 1 of that patent constitute a synthesizer.

Figure 3:
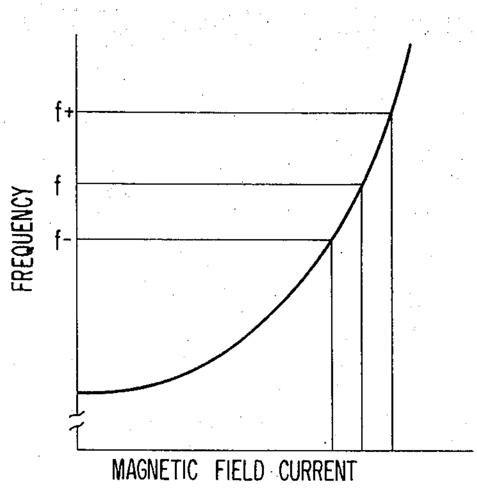
FIG. 3 is an oscillation frequency vs. magnetic field-electric current characteristic of the atomic oscillator shown in FIG. 2.

It has been often the practice to control the oscillation frequency of an atomic oscillator by providing a coil for the creation of a magnetic field for the atomic oscillator and utilising a phenomenon that the hyperfine resonant frequency varies slightly with changes in the magnetic field intensity caused by current flowing in the coil. FIG. 3 depicts the relationship between the magnetic field intensity and the output frequency. As illustrated, the output frequency increases (decreases) with the increase (the decrease) of the current or the magnetic field intensity. The atomic oscillator 11 is designed to be capable of switching its output frequency between the reference, the upper-side, and the lower-side frequencies by utilizing the phenomenon. For this objective, the atomic oscillator 11 is further provided with the two additional coils 768 and 769 for changing the magnetic field intensity by applying a control signal.

The atomic oscillator 11 is further provided with a limit signal receiver 81 for receiving a limit signal from the base station 50. The limit signal received by the receiver 81 is applied to a switching controller 82. The switching controller 82 is designed to control the operation of the switch 83 in such a manner that a control signal from the control signal generator 84 is applied to either coil 768 or coil 769, or to neither 768 nor 769 in response to the limit signal from the limit signal receiver 81. When the control signal is applied to neither coil 768 nor coil 769, the atomic oscillator will set up oscillations of the reference frequency and when the control signal is applied to the coil 768 only, oscillations of the upper-side frequency will be set up. Further, oscillations of the lower-side frequency will be set up when the control signal is applied to the coil 769 only. In such a manner, the output frequency of the atomic oscillator can be switched in three steps.

While two additional coils for control signals have been newly installed according to this embodiment, the similar effect could evidently be obtained by installing a single coil for control signals and varying suitably the magnitude and direction of the control signal current. Furthermore, it is possible to control the oscillation frequency by superimposing a control signal to the signal applied to the coil 767 without the additional coils 768 and 769.

In this manner, the synchronism can be maintained infinitely by controlling the oscillation frequency of the atomic oscillator at the remote station by the use of the limit signal delivered from the base station.

If the difference between the reference frequency and the upper- or lower-side frequency is set at $10^{-9}$ of the reference frequency, or 0.005 Hz with respect to 5 MHz, by taking into account the frequency stabilization of the atomic oscillator, the phase shift amount can be brought to the opposite limit within an extremely brief time interval.

Referring again to FIGS. 1 and 2, an indicator 62 for indicating a phase-difference signal incoming from the switch 59A is installed at the base station 50. If the phase-difference signals delivered from the automatic phase shifters 56, 57, and 58 are displayed on the indicator 62, one at a time, through switching operation, a message can be sent to a corresponding remote station by a telephone set 63 via a switching network 47 whenever the phase difference is about to reach the limit. Upon receipt of the message over a telephone set 16 installed at the remote station 10, the operator at the station can proceed to the manual control of a switching controller 82. An ordinary telephone may be used for the same purpose without resorting to the exclusive telephone service.

Such a telephone communication can also be utilized for starting the operation of the equipment at both stations. Since the base station and the remote station are brought into operation independently of each other, it is the common practice that the signal delivered from the remote station and the signal of the base station are entirely out of phase. In such a case, synchronism can be set up at the remote station by varying the phase shift amount of the phase shifter 12 as soon as information on the phase difference displayed on the indicator 62 is received from the telephone set 63 at the base station. Furthermore, the synchronism of the synchronizing signals between both stations may be set up by temporarily varying the ratio of the frequency counter 13 of the remote station in response to the message from the telephone, if the phase difference signal is indicated in the indicator 62. It will be evident that the phase-shifter 12 at the remote station may be omitted in the case where the frequency of the atomic oscillator is automatically controlled by the use of the limit signal delivered from the base station.

The description has been so far made referring to the embodiment as applied to the multi-station synchronizing system of the NTSC color television broadcast. However, it is obvious to those skilled in the art that this invention is applicable to the synchronizing system for two transmitters, one at one base station and the other at one remote station. Likewise, this invention finds application in other signal transmission systems, such as the PAL or SECAM color television broadcast systems and the PCM transmission system.

When applied to the 24-CH PCM transmission system, the atomic oscillator is used as the clock pulse generator for generating a clock pulse of 1.544 MHz. For example, in the rubidium atomic oscillator 11 shown in FIG. 2, the frequency 5 MHz of the output signal of the voltage-controlled oscillator 71 is converted to the clock frequency of 1.544 MHz. In the PCM transmission system capable of the two-way transmission, the limit signal may be transmitted by using an additional pulse of low-frequency with a slight expansion of the transmission bandwidth, since the limit signal is a very low frequency. If the expansion of the bandwidth is impossible, the limit signal may be transmitted by one channel of the 24 transmission channels by which the signals are transmitted from the base station to the remote station. In the latter, one channel of the 24 channels from the remote station to the base may be used for the sending back of signal representing the reception of the limit signal.

What is claimed is:

1. In a synchronizing system for a plurality of signal transmitters, one of said transmitters situated at a base station and at least one other transmitter situated at a remote station, each of said transmitters including an independently operating reference frequency signal oscillator, the improvement for maintaining phase synchronization between the signals generated by the oscillator at said base station and the oscillator at said remote station, comprising:

first transmission means at said remote station for transmitting to said base station a signal having a phase dependent on the phase of the signal generated by the oscillator at said remote station, phase detector means at said base station connected to receive the signal generated by the oscillator at said base station and the signal transmitted by said first transmission means for producing varying phase difference signal proportional to the changing phase difference between the signals generated by the oscillators at said base and remote stations due to a difference in frequency of the signals, phase limit detector means at said base station and connected to said phase detector means to receive said varying phase difference signal for producing a limit signal when said varying phase difference signal exceeds a predetermined value, second transmission means at said base station for transmitting to said remote station said limit signal, and frequency changing means at said remote station connected to receive said limit signal for changing the frequency of the oscillator at said remote station in a direction to invert the sign of said varying phase difference signal.

2. The improvement of claim 1 further comprising:

phase shifting means at said base station connected to receive the signal from said first transmission means and said varying phase difference signal from said phase detector means for phase synchronizing said signal from said first transmission means with the signal generated by the oscillator at said base station, and color video signal source and signal processing means at said base station connected to receive a signal from the oscillator at said base station and the phase synchronized signal from said phase shifting means for processing signals from said base station and said remote station in phase synchronization.

3. The improvement of claim 1 wherein the oscillator at said remote station is a rubidium atomic oscillator, including means for generating a magnetic field, said means for changing the oscillating frequency being coupled to said atomic oscillator and comprising means for controlling the magnetic field of the atomic oscillator.

4. The improvement of claim 3 wherein said means for controlling the magnetic field comprises first and second coils, means for generating a control signal, switch means for selectively connecting said control signal generating means to one or neither of said coils, and means, responsive to said limit signal, for controlling said switch means.

5. The improvement of claim 1 wherein said base station further includes indicator means for displaying said varying phase difference signal, and said remote station further includes manually operable means for further controlling said frequency changing means.

6. The improvement of claim 1 wherein the reference frequency signal oscillator at said base station is a rubidium atomic oscillator, said improvement further including a plurality of remote stations each including a rubidium atomic oscillator, said base station further including a plurality of phase detector means each responsive to signals from a different remote station and said base station for producing a plurality of varying phase difference signals.

7. The improvement of claim 6 wherein said base station further includes first switch means for selectively connecting each of said phase detector means to said phase limit detector means and second switch means, for selectively coupling the frequency changing means at each of the remote stations to said phase limit detector means.

8. The improvement of claim 6 wherein said base station further includes a plurality of phase limit detector means coupled, respectively, between a phase detector means and its associated remote station.

9. The improvement of claim 7 wherein each of said remote stations includes first transmission means and the signals transmitted by said first transmission means at each of said remote stations are color video signals, said first transmission means each including phase shifter means responsive to the reference frequency signal oscillator for phase shifting the oscillator output, frequency divider means for producing from said phase shifted oscillator output a signal having twice the horizontal synchronizing signal frequency of said color video signals, a synchronizing generator responsive to the output of said divider and a color video source responsive to said synchronizing generator and the output of said oscillator for producing said color video signals.

* * * * *

UNITED STATES PATENT OFFICE

CERTIFICATE OF CORRECTION

Patent No. 3,862,365 Dated January 21, 1975

Inventor(s) Hachisaburo Kobayashi et al

It is certified that error appears in the above-identified patent and that said Letters Patent are hereby corrected as shown below:

IN THE HEADING:

First Assignee's name misspelled-- should be-- Nippon Hoso Kyoaki--

Signed and Sealed this

*ninth* Day of *September 1975*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,862,365

DATED : January 21, 1975

INVENTOR(S) : Hachisaburo Kobayashi et al

It is certified that error appears in the above-identified patent and that said Letters Patent are hereby corrected as shown below:

First Assignee's name misspelled -- should be -- Nippon Hoso Kyokai.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*